United States Patent [19]

Atkinson et al.

[11] Patent Number: 4,649,771
[45] Date of Patent: Mar. 17, 1987

[54] PLANETARY GEAR DRIVE WITH CLUTCHING ASSEMBLY

[75] Inventors: Robert W. Atkinson; Mark J. Fogelberg, both of Muncie, Ind.

[73] Assignee: Borg-Warner Corporation, Chicago, Ill.

[21] Appl. No.: 768,990

[22] Filed: Aug. 26, 1985

[51] Int. Cl.[4] .................. F16H 3/44; F16H 57/10
[52] U.S. Cl. .................... 74/781 R; 192/53 B
[58] Field of Search .......... 74/781 R, 762, 760, 74/75 B; 192/18 A, 53 B

[56] References Cited

U.S. PATENT DOCUMENTS

| | | | |
|---|---|---|---|
| 1,739,946 | 12/1929 | Carhart | 192/53 B |
| 2,115,964 | 5/1938 | Osborne | 74/781 R |
| 2,682,327 | 6/1954 | Retz | 192/53 B |
| 2,771,795 | 11/1956 | Orr | 74/781 R |
| 2,933,944 | 4/1960 | Carnagna | 74/472 |
| 3,063,529 | 11/1962 | Cook | 192/53 B |
| 3,295,394 | 1/1967 | Whateley | 74/781 R |
| 3,559,508 | 2/1971 | Kelbel | 74/864 |
| 3,580,371 | 5/1971 | Kron et al. | 192/53 B |
| 3,631,741 | 1/1972 | Kelbel | 74/781 R |
| 4,056,990 | 11/1977 | Hatano | 74/781 R |
| 4,484,494 | 11/1984 | Sakakibara | 74/781 R |

Primary Examiner—Leslie Braun
Assistant Examiner—Dirk Wright
Attorney, Agent, or Firm—Julian Schachner

[57] ABSTRACT

An overdrive transmission including a rotatable input shaft, a rotatable output shaft, a one-way clutch engageable for establishing a one-to-one drive path from said input shaft to said output shaft, a planetary gear set engaging said input and output shafts, and a clutching assembly including a synchronizing clutch, a positive clutch, and an overdrive brake, said synchronizing clutch being engageable for establishing a one-to-one ratio through said planetary gear set, said positive clutch being engageable for establishing a one-to-one ratio through said planetary gear set, and said brake being engageable for establishing an overdrive ratio through planetary gear set.

10 Claims, 3 Drawing Figures

PLANETARY GEAR DRIVE WITH CLUTCHING ASSEMBLY

BACKGROUND OF THE INVENTION

This invention relates generally to an overdrive transmission adapted for use in the driveline of an automotive vehicle. More particularly, it is directed to an overdrive transmission for use between the mainshaft of a conventional transmission and the vehicle propeller shaft. The overdrive transmission operates automatically in the direct drive mode, the direct coast mode and the reverse mode. It is shiftable smoothly into and out of the overdrive mode.

The typical overdrive transmission includes a gear set of some kind which has two operating conditions; one providing a direct, one-to-one ratio and another providing an overdrive ratio. A clutching device shifts between direct and overdrive at appropriate times. U.S. Pat. No. 2,771,795 issued Nov. 27, 1956 discloses an overdrive transmission in which a one-way clutch provides direct drive, and a wrapped spring friction clutch provides direct coat and reverse. The friction clutch must carry high torque in reverse, and may not hold when the vehicle is parked facing downhill. Furthermore, the friction clutch wastes energy by developing frictional drag when the transmission is in overdrive.

U.S. Pat. No. 2,933,944 issued Apr. 26, 1960 discloses an overdrive transmission in which a jaw clutch replaces the function of the wrapped spring friction clutch. The jaw clutch carries full torque in overdrive and in direct coast. Therefore it is difficult to downshift from overdrive to direct when in coast. Furthermore, a momentary torque reversal is required in order to complete this downshift.

U.S. Pat. No. 3,559,508 issued Feb. 2, 1971 discloses an overdrive transmission in which a jaw clutch carries torque in direct coast. However, the transmission can be downshifted from overdrive to direct only when operating in drive, and not when operating in coast.

U.S. Pat. No. 3,631,741 issued Jan. 4, 1972 discloses an overdrive transmission in which a two-way roller clutch provides driect drive and coast. Here the backlash inherent in this type of clutch causes lurching during the shift between drive and coast. Furthermore, a severe shock to the driveline will be developed where the transmission is downshifted from overdrive to direct while operating in coast.

There remains a need in the art for an overdrive transmission which operates automatically to provide direct drive, direct coast and reverse, and which is shiftable smoothly into and out of overdrive under both drive and coast conditions. The overdrive transmission should not require a friction clutch having a large torque capacity, but rather should allow the use of a small capacity clutch in the interest of space conservation and economy. It should not require an external torque reversal or interruption in order to complete the shift. Further, it should have a direct mechanical connection in the driveline in order to insure that the vehicle does not roll when parked.

SUMMARY OF THE INVENTION

This invention is directed to meeting this need. To that end, there is disclosed herein an overdrive transmission including a rotatable input shaft, a rotatable output shaft, direct drive means engageable for establishing a one-to-one drive path from the input shaft to the output shaft, high/low range means engaging the input and output shafts, and a clutching assembly including synchronizing clutch means, positive clutch means, and overdrive brake means. The synchronizing clutch means is engageable for establishing a one-to-one ratio through the range means. The positive clutch means also is engageable for establishing a one-to-one ratio through the range means. The brake means is engageable for establishing an overdrive ratio through the range means.

BRIEF DESCRIPTION OF THE DRAWING

The objects and advantages of this invention will become apparent to those skilled in the art upon careful consideration of the specification herein, including the drawing, wherein.

Figure 1:
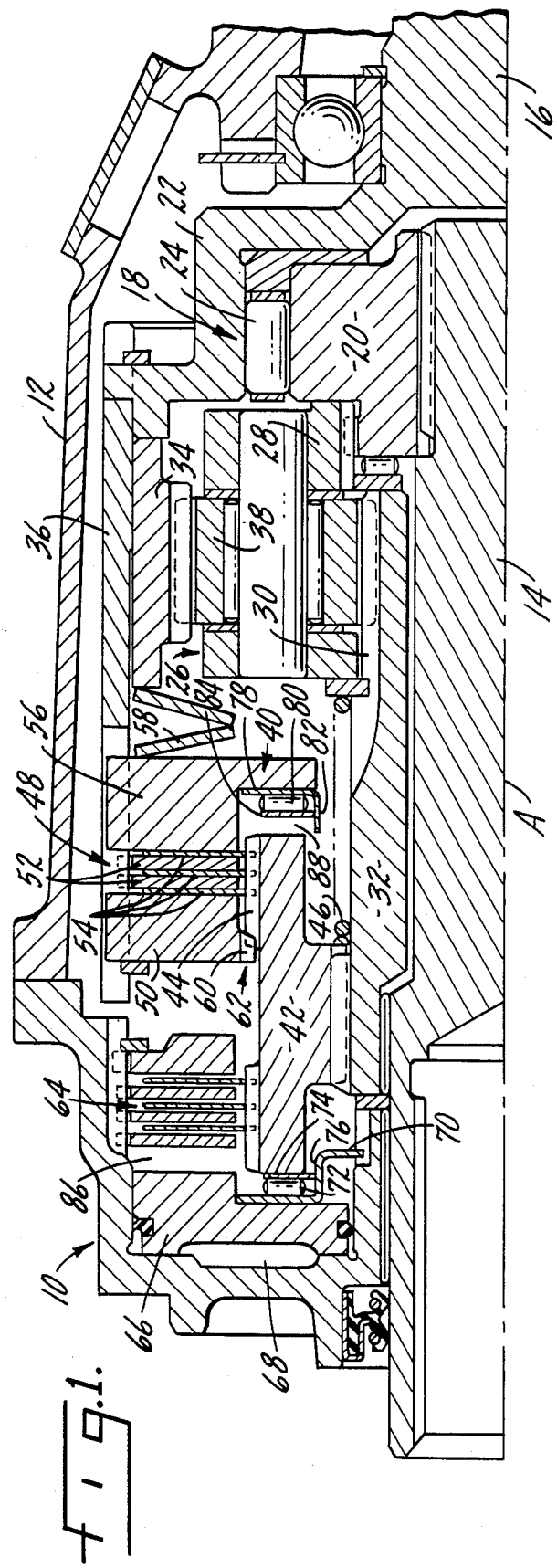
FIG. 1 is a sectional view showing details of the overdrive transmission of this invention in the direct and reverse modes.

While this invention is susceptible of embodiment in many different forms, the preferred embodiment is shown in the drawing and described in detail. It should be understood that the present disclosure is considered to be an exemplification of the principles of the invention, and is not intended to limit the invention to this embodiment.

DESCRIPTION OF THE PREFERRED EMBODIMENT

Referring now to FIG. 1 in greater detail, the preferred embodiment of this invention incorporates an overdrive transmission 10 which may be an auxiliary transmission used in conjunction with the conventional transmission of an automotive vehicle. Alternatively, overdrive transmission 10 may be an integral part of the conventional transmission.

Overdrive transmission 10 includes a case 12 within which are supported an input shaft 14 and an output shaft 16. In the preferred form of the invention, shafts 14 and 16 are coaxial, and are rotatable about their longitudinal axis A. Input shaft 14 is adapted to be driven by the mainshaft of a conventional transmission. Output shaft 16 is adapted to drive the propeller shaft of a vehicle.

A direct drive device 18 preferably takes the form of a one-way clutch. An inner race element 20 is secured to input shaft 14 for rotation therewith. An outer race element 22 is integral with or secured to output shaft 16 for rotation therewith. Suitable locking elements 24 engage automatically to lock races 20 and 22 when drive from shaft 14 to shaft 16 is sensed. Locking elements 24 release automatically when drive in the opposite direction is sensed. Thus one-way clutch 18 is arranged such that input shaft 14 will drive output shaft 16 in the forward direction, but that output shaft 16 will overrun rather than drive input shaft 14.

A high/low range mechanism 26 preferably takes the form of a planetary gear set. A carrier 28 is secured to race 20 of one-way clutch 18 for rotation with input shaft 14. A sun gear 30 is formed at one end of a quill 32 which is rotatable on axis A relative to input shaft 14. A ring gear 34 is secured to a ring gear housing 36, which in turn is secured to output shaft 16 for rotation therewith. Suitable planet pinions 38 are rotatably supported by carrier 28 in meshing relationship with sun gear 30 and ring gear 34.

A clutching assembly 40 includes a device in the form of a loosely splined to quill 32 for rotation therewith and axial sliding movement relative thereto on axis A. Hub 42 defines clutch teeth 44. First resilient means 46, in the form of a coil spring or the like, biases hub 42 to the left as shown in FIG. 1.

Clutching assembly 40 further includes a synchronizing clutch 48, preferably in the form of a friction disc pack, which is operably effective to frictionally engage two members of the planetary gear set together. In its presently preferred form, the synchronizing clutch is engageable for frictionally engaging hub 42 and housing 36 together, thereby locking up planetary gear set 26. Synchronizing clutch 48 includes a reaction plate 50 secured to housing 36 for rotation therewith. Interleaved friction disks 52 and 54 are alternatively slidably supported by housing 36 and teeth 44 of hub 42. A pressure plate 56 is supported by housing 36 for rotation therewith and sliding movement relative thereto. Second resilient means 58, in the form of a Belleville spring or the like, biases sliding pressure plate 56 to the left as shown in FIG. 1.

Plate 50 defines clutch teeth 60 which are engageable by clutch teeth 44 of hub 42. Together they constitute a positive clutch 62 which also is part of clutching assembly 40. The positive clutch 62 is operably effective to lock two members of said planetary gear set together. Teeth 44 and 60 are preferably formed as flat teeth in order that they may ratchet silently as they move relatively into mesh.

Discs 54 engage teeth 44 of hub 42 with a relatively tight clearance. Teeth 60 of plate 50 engage teeth 44 with a relatively loose clearance. Thus when hub 42 is in the position shown in FIG. 1, teeth 44 and 60 are in mesh, but jaw clutch 62 does not engage until the torque capacity of synchronizing clutch 48 has been exceeded and it begins to slip.

Clutching assembly 40 further includes an overdrive brake 64, preferably in the form of another friction disc pack. The overdrive brake is operably effective to ground one member of the planetary gear set to the transmission housing or case 12. In its presently preferred form, the overdrive brake 64 is engageable for locking hub 42 to case 12, thereby grounding sun gear 30. An actuator 66, preferably in the form of a fluid-actuated piston, is slidable in a cylinder 68.

A thrust washer 70 is keyed to case 12 and is interposed between piston 66 and a suitable bearing 72. A thrust washer 74 is piloted on an annular surface 76 of thrust washer 70 between bearing 72 and hub 42. As shown in FIG. 1, spring 46 biases hub 42 into contact with piston 66 through thrust washer 74, bearing 72 and thrust washer 70. Thus spring 46 also biases piston 66 to the left.

Similarly, a thrust washer 78 is interposed between sliding pressure plate 56 and a suitable bearing 80. Thrust washer 78 defines an annular lip 82 on which a thrust washer 84 is piloted between bearing 80 and hub 42.

As shown in FIG. 1, a relatively wide gap 86 is defined between piston 66 and overdrive brake 64. A relatively narrow gap 88 is defined between hub 42 and thrust washer 84, and thus effectively between hub 42 and pressure plate 56.

In the position shown in FIG. 1, Belleville spring 58 engages synchronizing clutch 48. Spring 46 biases teeth 44 and 60 into mesh, and thus effectively biases jaw clutch 62 toward engagement. By biasing piston 66 to the left, spring 46 also disengages overdrive clutch 64.

For operation of overdrive transmission 10 in the direct drive mode, one-way clutch 18 engages to lock shafts 14 and 16 together. Torque is transferred directly from shaft 14 to shaft 16.

In the direct coast mode there will be a tendency for shaft 16 to overrun shaft 14. In this condition one-way clutch 18 disengages, and direct coast torque is split. Approximately two-thirds is transferred from shaft 16 through ring gear 34 of planetary gear set 26 to shaft 14. The remaining one-third is transferred from shaft 16 through synchronizing clutch 48 and sun gear 30 of planetary gear set 26 to shaft 14. As direct coast torque is engine braking torque, it is anticipated that synchronizing clutch 48 need not be large. In the unlikely event that direct coast torque exceeds the torque capacity of synchronizing clutch 48, it will slip until jaw clutch 62 engages. Thereafter direct coast torque will be carried by jaw clutch 62.

Figure 2:
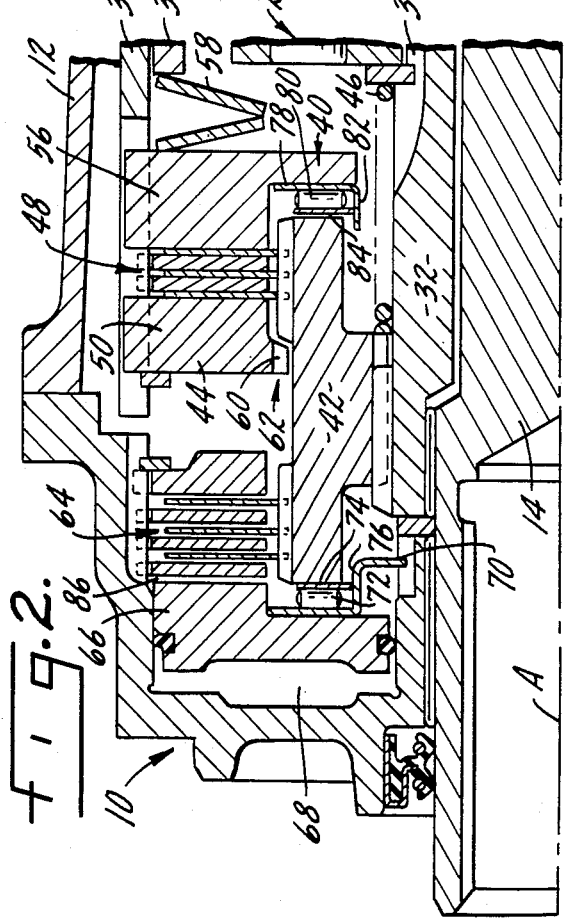
FIG. 2 is a partial sectional view, similar to FIG. 1, showing the overdrive transmission of this invention during the transition between the driect and overdrive modes.

For operation in the overdrive mode, a suitable control system (not shown) directs fluid into cylinder 68. Piston 66 moves hub 42 to the right against the biasing force of spring 46 about and along the axis of rotation A, first to the position shown in FIG. 2 and then to the position shown in FIG. 3. That is, the linear disposition of hub 42 controls the operable effectiveness of both the synchronizing clutch means and the overdrive brake means. As shown in FIG. 2, hub 42 is adjacent thrust washer 84. In this position jaw clutch 62 is disengaged, but synchronizing clutch 48 remains engaged. Gap 86 is narrowed, but overdrive brake 64 remains disengaged.

Figure 3:
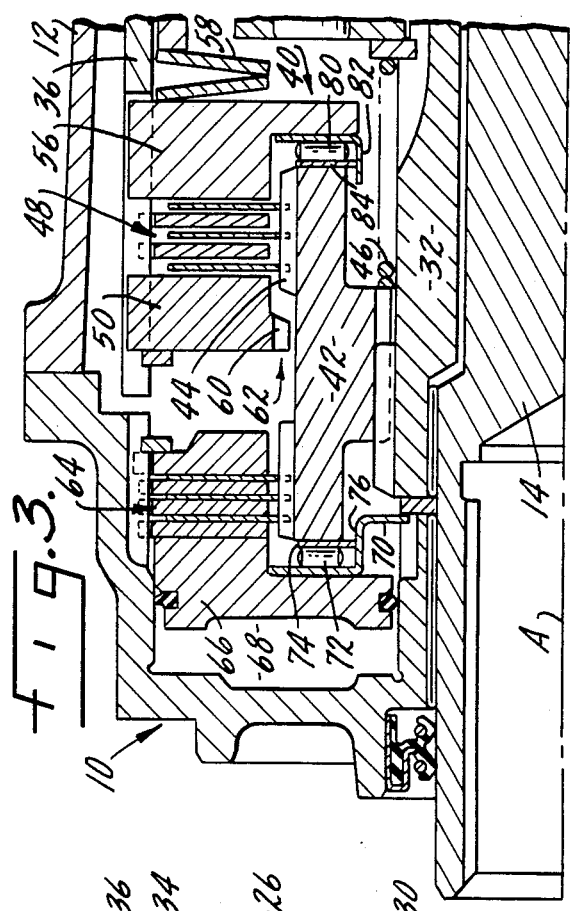
FIG. 3 is a partial sectional view, similar to FIG. 1, showing the overdrive transmission of this invention in the overdrive mode.

Continued rightward movement of piston 66 causes hub 42 to move reaction plate 56 to the right against the biasing force of Belleville spring 58. As shown in FIG. 3, synchronizing clutch 48 now is disengaged. Piston 66 moves into abutment with overdrive brake 64, which now is engaged. Sun gear 30 is grounded, and serves as a reaction member for planetary gear set 26. Ring gear 34 is driven at a higher speed than carrier 28, causing shaft 16 to overspeed shaft 14. This condition will obtain when the transfer of torque is in either direction; that is, in overdrive drive or coast.

To shift from overdrive (FIG. 3) to direct and reverse (FIG. 1), fluid pressure in cylinder 68 is relieved. Spring 46 and 58 move hub 42 and pressure plate 56 respectively to the left. Spring 58 preferably is stronger than spring 46, and the spacing of the various elements is such that overdrive brake 64 disengages and clutch 48 engages (FIG. 2) in order to bring hub 42 and plate 50 into approximate synchronism. Jaw clutch 62 then engages (FIG. 1). During the interim period teeth 44 and 60 may ratchet silently prior to meshing.

When the vehicle is operated in the reverse mode, one-way clutch 18 disengages. As reverse typically is a low-speed, high-torque operation, synchronizing clutch 48 will slip. Jaw clutch 62 will engage to transfer torque between shafts 14 and 16 in reverse drive or coast.

Those skilled in the art will appreciate that the overdrive transmission of this invention provides for the transfer of torque between an input and an output automatically in direct drive, direct coast and reverse drive and coast. When conditions are such that overdrive is called for, the transmission is shifted smoothly into overdrive, and torque is transferred in overdrive drive and coast. The transmission may be shifted smoothly in the opposite direction, from overdrive to direct, when operating in either drive or coast.

Engagement of the one-way clutch is automatic, and engagement of the synchronizing clutch, jaw clutch and overdrive brake is synchronized. The synchronizing clutch may be small, as it is required to carry only direct coast torque. The jaw clutch provides a direct mechanical connection in the driveline to insure that the vehicle does not roll when parked on a hill.

Although this invention has been describd with reference to an overdrive transmission, those skilled in the art will appreciate that the principles apply also to an underdrive transmission.

It should be understood that while the preferred embodiment of the invention has been shown and described, this is to be considered as illustrative and may be modified by those skilled in the art. It is intended that claims herein cover all such modifications as may fall within the spirit and scope of the invention.

What is claimed is:

1. A clutching assembly with a planetary gear set including a sun gear member rotatable about an axis of rotation thereof, a ring gear member, a carrier member, and a plurality of planet pinions rotatably supported by said carrier member in meshing relationship with said sun and ring gear members, said clutching assembly comprising synchronizing clutch means, positive clutch means, and brake means, said synchronizing clutch means operably effective to frictionally engage said sun and ring gear members together, said positive clutch means operably effective to lock said sun and ring gear members together, said brake means operably effective to ground said sun gear member, and an operative device disposed for displacement about and along the axis of rotation of said sun gear member for controlling the operable effectiveness of both said synchronizing clutch means.

2. An overdrive transmission comprising a housing; a rotatable input shaft, a rotatable output shaft, direct drive means engageable for establishing a one-to-one drive path from said input shaft to said output shaft, high/low range means including a planetary gear set for engaging said input and output shafts, said planetary gear set having a sun gear member, a ring gear member, a carrier member and a plurality of planet pinions rotatably supported by said carrier member in meshing relationship with said sun and ring gear members, a clutching assembly including synchronizing clutch means, positive clutch means, and overdrive brake means, said synchronizing clutch means being operably effective to engage two of said members together in a manner establishing a one-to-one ratio through said range means, said positive clutch means being operably effective to lock two of said members together in a manner establishing a one-to-one ratio through said range means, said overdrive brake means being operably effective to ground one of said members to said housing in a manner establishing an overdrive ratio through said range means, and a device disposed for displacement within said housing for controlling the operable effectiveness of both said synchronizing clutch means and said overdrive brake means.

3. The overdrive transmission of claim 2, said carrier member being rotatable with said input shaft, and said ring gear member being rotatable with said output shaft, said synchronizing clutch means being engageable for frictionally engaging said sun and ring gear members together, said positive clutch means being engageable for locking said sun and ring gear members together, and said brake means being engageable for grounding said sun gear member.

4. The overdrive transmission of claim 3, said clutching assembly further including means biasing said brake means toward disengagement and said synchronizing and positive clutch means toward engagement, and actuating means for disengaging said positive and synchronizing clutch means and engaging said brake means.

5. An overdrive transmission comprising:
a rotatable input shaft;
a rotatable output shaft;
direct drive means engageable for establishing a one to one drive path from said input shaft to said output shaft, said direct drive means including a one way clutch;
high/low range means engaging said input and output shafts, said range means including a planetary gear set having a sun gear member, a ring gear member rotatable with said output shaft, a carrier member rotatble with said input shaft, and a plurality of planet pinions rotatably supported by said carrier member in meshing relationship with said sun and ring gear members; and
a clutching assembly including synchronizing clutch means, positive clutch means, overdrive brake means, means biasing said brake means toward disengagement and said synchronizing and positive clutch means toward engagement, said clutching assembly being constructed and arranged such that said biasing means sequentially disengages said brake means, engages said synchronizing clutch means, and engages said positive clutch means,
said clutching assembly further including actuating means operably for sequentially disengaging said positive clutch means, disengaging said synchronizing clutch means, and engaging said brake means, with said synchronizing clutch means being engageable for frictionally engaging said sun and ring gear members together in a manner establishing a one-to-one ratio through said range means, said positive clutch means being engageable for locking said sun and ring gear members together in a manner establishing a one to one ratio through said range means, said brake means being engageable for grounding said sun gear member in a manner establishing an overdrive ratio through said range means.

6. The overdrive transmission of claim 5 said clutching assembly further including a hub rotatable with and slidable relative to said sun gear member, said synchronizing clutch means including a reaction plate secured to said ring gear member for rotation therewith, a pressure plate secured to said ring gear member for rotation therewith and sliding movement relative thereto toward and away from said reaction plate, and a plurality of friction discs alternately slidably supported by said hub and ring gear member between said reaction and pressure plates, said positive clutch means including meshable teeth defined by said hub and reaction plate, said actuating means including a piston slidable toward and away from said brake means, and said biasing means including first resilient means biasing said hub into contact with said piston and biasing said hub teeth toward meshing engagement with said reaction plate teeth, and second resilient means biasing said pressure plate toward said reaction plate.

7. The overdrive transmission of claim 6, said piston being spaced from said brake means by a relatively wide gap and said hub being spaced from said pressure plate by a relatively narrow gap when said brake means is disengaged and said positive and synchronizing clutch means are engaged, said piston being slidable such that it sequentially slides said hub to move said teeth out of meshing engagement thereby disengaging said positive clutch means, continues to slide said hub to move said pressure plate away from said reaction plate thereby disengaging said synchronizing clutch means, and itself continues to slide into abutment with said brake means thereby engaging said brake means.

8. The overdrive transmission of claim 6, said hub and its associated friction discs having a relatively tight clearance, and said teeth, when in mesh, having a relatively loose clearance.

9. The overdrive transmission of claim 8, said teeth being flat, whereby they may rachet silently prior to meshing.

10. The overdrive transmission of claim 6, said teeth being flat, whereby they may rachet silently prior to meshing.

* * * * *